United States Patent
Zhao et al.

(10) Patent No.: US 12,185,320 B2
(45) Date of Patent: Dec. 31, 2024

(54) SIDELINK INFORMATION REPORTING METHOD AND APPARATUS, AND TERMINAL AND READABLE STORAGE MEDIUM

(71) Applicant: GUANGDONG OPPO MOBILE TELECOMMUNICATIONS CORP., LTD., Guangdong (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 267 days.

(21) Appl. No.: 17/724,621

(22) Filed: Apr. 20, 2022

(65) Prior Publication Data
US 2022/0248441 A1 Aug. 4, 2022

Related U.S. Application Data

(63) Continuation of application No. PCT/CN2019/116807, filed on Nov. 8, 2019.

(51) Int. Cl.
*H04W 72/20* (2023.01)
*H04L 1/1867* (2023.01)
(Continued)

(52) U.S. Cl.
CPC ............. *H04W 72/20* (2023.01); *H04L 1/188* (2013.01); *H04L 1/1887* (2013.01);
(Continued)

(58) Field of Classification Search
CPC .... H04W 72/20; H04W 72/1263; H04W 4/46
See application file for complete search history.

(56) References Cited

U.S. PATENT DOCUMENTS

| | | | |
|---|---|---|---|
| 2018/0199359 A1* | 7/2018 | Cao | ........................ H04L 1/1896 |
| 2019/0013903 A1* | 1/2019 | Zhang | .................... H04L 1/1854 |
| 2019/0364588 A1 | 11/2019 | Lu et al. | |

FOREIGN PATENT DOCUMENTS

| | | |
|---|---|---|
| CN | 107197528 A | 9/2017 |
| CN | 108111263 A | 6/2018 |

(Continued)

OTHER PUBLICATIONS

Decision to Grant of the Chinese application No. 202210157152.7, issued on Jun. 28, 2023. 7 pages with English translation.
(Continued)

*Primary Examiner* — Jackie Zuniga Abad
(74) *Attorney, Agent, or Firm* — PERKINS COIE LLP

(57) ABSTRACT

The present disclosure provides an information reporting method and apparatus, and a terminal and a readable storage medium. The method includes: a sending end obtains a period of transmission resources configured and authorized by a network; transmit a transmission block to a receiving end based on the transmission resources, the transmission resources being used for transmitting a same transmission block or a plurality of different transmission blocks; report a preset information quantity of report information to the network according to a transmission status and/or a feedback status of the receiving end.

10 Claims, 3 Drawing Sheets

```
┌─────────────────────────────────────────────────────┐
│ A transmitting end acquires transmission resources  │──S10
│ in a period of configured grant from a network      │
└─────────────────────────────────────────────────────┘
                          │
                          ▼
┌─────────────────────────────────────────────────────┐
│ Transmit a transmission block to a receiving end    │
│ based on the transmission resources, wherein the    │──S20
│ transmission resources is used for transmitting a   │
│ same transmission block or a plurality of           │
│ different transmission blocks                       │
└─────────────────────────────────────────────────────┘
                          │
                          ▼
┌─────────────────────────────────────────────────────┐
│ Report a preset amount of reporting information to  │
│ the network according to a transmission situation   │──S30
│ and/or a feedback situation of the receiving end    │
└─────────────────────────────────────────────────────┘
```

(51) Int. Cl.
   *H04L 5/00* (2006.01)
   *H04W 72/1263* (2023.01)
   *H04W 4/46* (2018.01)

(52) U.S. Cl.
   CPC ....... *H04L 5/0053* (2013.01); *H04W 72/1263* (2013.01); *H04W 4/46* (2018.02)

(56) References Cited

FOREIGN PATENT DOCUMENTS

| | | |
|---|---|---|
| CN | 108259144 A | 7/2018 |
| CN | 109803400 A | 5/2019 |
| CN | 110383749 A | 10/2019 |
| WO | 2018001185 A1 | 4/2018 |
| WO | 2018145296 A1 | 8/2018 |
| WO | 2019127115 A1 | 7/2019 |

OTHER PUBLICATIONS

TCL Communication "Resource allocation for NR sidelink Mode 1" R1-1910410; 3GPP TSG RAN WG1 Meeting #98b; Chongqing, China; Oct. 14-20, 2019. 11 pages.
Examination Report for European Application No. 19951691.5 issued Mar. 17, 2023. 6 pages.
Notice of Reason for Refusal for Japanese Application No. 2022-524701 Issued Oct. 27, 2023, 6 Pages with English Translation.
Ericsson "Uu-based sidelink resource allocation" R1-1910533; 3GPP TSG-RAN WG1 Meeting #98bis; Chongqing, China; Oct. 14-20, 2019. 22 pages.
Examination Report for Indian Application No. 202227029844 issued Oct. 3, 2022. 7 pages with English translation.
Extended European Search Report for European Application No. 19951691.5 issued Aug. 2, 2022. 8 pages.
International Search Report Mailed Jul. 24, 2020 In Application No. PCT/CN2019/116807.
European Search Report of the European application No. 24151525.3, issued on Mar. 7, 2024. 8 pages.
Second Office Action of the Japanese application No. 2022-524701, issued on Mar. 29, 2023. 6 pages with English translation.
Samsung, R1-1902278, Considerations on Sidelink HARQ Procedure, 3GPP TSG RAN WG1 #96, Athens, Greece, Feb. 25-Mar. 1, 2019. 11 pages.
First Office Action of the Vietnam application No. 1-2022-03057, issued on Aug. 30, 2024. 4 pages with English translation.

\* cited by examiner

SIDELINK INFORMATION REPORTING METHOD AND APPARATUS, AND TERMINAL AND READABLE STORAGE MEDIUM

CROSS-REFERENCE TO RELATED APPLICATION

The present application is a continuation application of International PCT Application No. PCT/CN2019/116807, filed on Nov. 8, 2019, the entire content of which is hereby incorporated by reference.

TECHNICAL FIELD

The present disclosure relates to the field of Device to Device communication technologies, in particular to a method, apparatus, and terminal for information reporting of sidelink, and a readable storage medium.

BACKGROUND

Device to Device (D2D) communication is based on a Sidelink (SL) transmission technology. Different from a traditional cellular system in which communication data is received or transmitted through a base station, a D2D system adopts a terminal-to-terminal direct communication manner, thus having a higher spectral efficiency and a lower transmission delay. With continuous development of technologies, D2D communication technologies have been continuously extended and expanded. Among them, a Vehicle to Everything (V2X) communication technology is a particular application of a D2D communication technology, which refers to communication between vehicles, or between vehicles and pedestrians, cyclists, as well as infrastructure.

Currently, a transmission mode of a V2X system includes that a network allocates a transmission resource to a terminal. In this mode, the network allocates periodically repeated transmission resources (including time domain, frequency domain, Demodulation Reference Signal (DMRS), etc.) of configured grant to the terminal, and the terminal sends sidelink data to other devices through the allocated transmission resources, and reports a fixed information amount (such as 1 bit) to the network in each period of configured grant. However, in practice, the network may configure a plurality of sidelink transmission resources for the terminal in each period (for example, there are four sidelink transmission resources in a period, and each transmission resource corresponds to different time) for the terminal to send sidelink data. At this time, how the terminal can perform sidelink data transmission and information reporting is a technical problem to be solved urgently.

SUMMARY

The present disclosure aims to provide a method, apparatus, and terminal for information reporting of sidelink, and a readable storage medium to solve a current technical problem of how a terminal can perform sidelink data transmission and information reporting when a plurality of transmission resources in a period may transmit sidelink data.

In order to achieve the above objective, an implementation of the present disclosure provides a method for information reporting of sidelink, which includes following acts: acquiring, by a transmitting end, transmission resources in a period of configured grant from a network; transmitting a transmission block to a receiving end based on the transmission resources, the transmission resources being used for transmitting a same transmission block or a plurality of different transmission blocks; reporting a preset amount of reporting information to the network according to a transmission situation and/or a feedback situation of the receiving end.

In addition, in order to achieve the above objective, an implementation of the present disclosure further provides an apparatus for information reporting of sidelink, including: a resource acquisition module, configured to acquire transmission resources in a period of configured grant from a network; a transmission module, configured to transmit a transmission block to a receiving end based on the transmission resources, the transmission resources being used for transmitting a same transmission block or a plurality of different transmission blocks; and a reporting module, configured to report a preset amount of reporting information to the network according to a transmission situation and/or a feedback situation of the receiving end.

In addition, in order to achieve the above objective, an implementation of the present disclosure further provides a terminal for information reporting of sidelink, including: a memory, a processor, and a computer program stored in the memory and executable by the processor, and following acts are implemented when the computer program is executed by the processor: acquiring transmission resources in a period of configured grant from a network; transmitting a transmission block to a receiving end based on the transmission resources, the transmission resources being used for transmitting a same transmission block or a plurality of different transmission blocks; and reporting a preset amount of reporting information to the network according to a transmission situation and/or a feedback situation of the receiving end.

In addition, in order to achieve the above objective, an implementation of the present disclosure further provides a readable storage medium, wherein a computer program is stored on the readable storage medium, when the computer program is executable by a processor, following acts are implemented: acquiring transmission resources in a period of configured grant from a network; transmitting a transmission block to a receiving end based on the transmission resources, the transmission resources being used for transmitting a same transmission block or a plurality of different transmission blocks; reporting a preset amount of reporting information to the network according to a transmission situation and/or a feedback situation of the receiving end.

According to the method, apparatus, and terminal for information reporting of sidelink, and the readable storage medium according to the implementations of the present disclosure, the transmitting end may transmit sidelink data to the receiving end based on acquired transmission resources, and the same transmission block or a plurality of different transmission blocks may be transmitted in each period, which enriches transmission modes. In addition, in this period, the transmitting end may also report a fixed amount of information according to an actual transmission situation and/or a feedback situation of the receiving end, so as to feed back a state of sidelink transmission to the network, which improves an information reporting process under transmission resources, facilitating improving integrity and stability of sidelink transmission.

Figure 1:
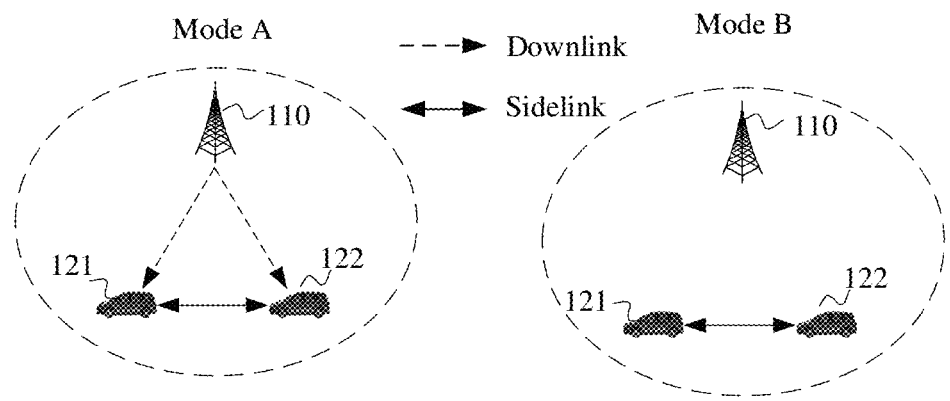
FIG. 1 is a schematic diagram of an application scenario according to an implementation of the present disclosure.

Realization of objectives, functional features, and advantages of the present disclosure will be further described in combination with implementations and with reference to the accompanying drawings.

DETAILED DESCRIPTION

Technical solutions in the implementations of the present disclosure will be described below with reference to accompanying drawings in the implementations of the present disclosure. It is apparent that the implementations described are merely a part of the implementations of the present disclosure, rather than all of the implementations of the present disclosure. According to the implementations of the present disclosure, all other implementations obtained by a person of ordinary skill in the art without making inventive efforts shall fall within the protection scope of the present disclosure.

It should be understood that the technical solutions of the implementations of the present disclosure may be applied to a Device to Device (D2D) communication system, such as a Vehicle to Everything system based on Long Term Evolution (LTE) for D2D communication, or a New Radio-Vehicle to Everything (NR-V2X) system. Unlike a traditional LTE system in which communication data is received or sent between terminals through a network device (e.g., a base station), a Vehicle to Everything system adopts a terminal-to-terminal direct communication mode, therefore, has a higher spectrum efficiency and a lower transmission delay.

Optionally, a communication system on which a Vehicle to Everything system is based may be a Global System of Mobile communication (GSM) system, a Code Division Multiple Access (CDMA) system, a Wideband Code Division Multiple Access (WCDMA) system, a General Packet Radio Service (GPRS) system, an LTE system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system, a 5G New Radio (NR) system, etc.

A network device in the implementations of the present disclosure may be a Base Transceiver Station (BTS) in a GSM system or a CDMA system, or a NodeB (NB) in a WCDMA system, or an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device (gNB) in an NR network, or a network device in a future evolved Public Land Mobile Network (PLMN), etc.

A terminal device in the implementations of the present disclosure may be a terminal device capable of implementing D2D communication. For example, it may be a vehicle-mounted terminal device, or a terminal device in an LTE system (LTE UE), or a terminal device in an NR network (NR UE), or a terminal device in a future evolved Public Land Mobile Network (PLMN), which is not limited in the implementations of the present disclosure.

A D2D communication technology may be applied to Vehicle to Vehicle (V2V) communication or Vehicle to Everything (V2X) communication. In the V2X communication, X may generally refer to any device with wireless receiving and sending capabilities, such as, but not limited to, a slow-moving wireless apparatus, a fast-moving vehicle-mounted device, or a network control node with wireless transmitting and receiving capabilities. It should be understood that the implementations of the present disclosure are mainly applied to a V2X communication scenario, but may also be applied to any other D2D communication scenarios, which is not limited in the implementations of the present disclosure.

FIG. 1 is a schematic diagram of an application scenario according to an implementation of the present disclosure. FIG. 1 illustrates exemplarily one network device and two terminal devices. Optionally, a wireless communication system in an implementation of the present disclosure may include a plurality of network devices, and other numbers of terminal devices may be included within a coverage area of each network device, which is not limited in the implementations of the present disclosure.

Optionally, the wireless communication system may further include other network entities such as a Mobile Management Entity (MME), a Serving Gateway (S-GW), a Packet Data Network Gateway (P-GW), or the wireless communication system may further include other network entities such as a Session Management Function (SMF), Unified Data Management (UDM), an Authentication Server Function (AUSF), which is not limited in the implementations of the present disclosure.

In the Vehicle to Everything system, the terminal devices may communicate with each other using a mode A and a mode B.

Specifically, a terminal device 121 may communicate with a terminal device 122 through a D2D communication mode. During D2D communication, the terminal device 121 communicates with the terminal device 122 directly through a D2D link, that is, a SideLink (SL). In the mode A, a transmission resource of a terminal device is allocated by a base station, and the terminal device may send data on an SL according to the resource allocated by the base station. The base station may allocate a resource for single transmission to a terminal device, or may allocate a resource for semi-static transmission to the terminal device. In the mode B, a terminal device selects a transmission resource on SL resources autonomously. Specifically, a terminal device acquires an available transmission resource in a resource pool by means of listening, or the terminal device selects randomly a transmission resource from the resource pool.

Figure 2:
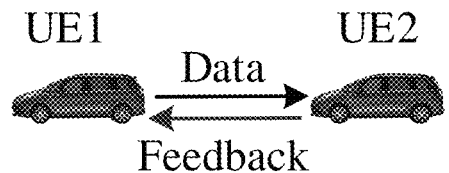
FIG. 2 is a schematic diagram of sidelink feedback between terminal devices according to an implementation of the present disclosure.

As shown in FIG. 2, in NR-V2X, a feedback channel is introduced on a sidelink in order to improve transmission reliability. User Equipment 1 (UE1) and UE2 form a unicast link, UE1 sends sidelink data to UE2, and UE2 sends sidelink feedback information, that is, Hybrid Automatic Repeat reQuest (HARQ) Acknowledgement (ACK) or Negative Acknowledgement (NACK), to UE1 according to a detection result of the received sidelink data. UE1 receives the feedback information from UE2 and decides whether to send retransmission of the data to UE2. UE1 may decide whether a receiving end terminal UE2 needs to send feedback information. For example, for broadcast communication, a receiving end does not need to feedback, but for unicast communication, the receiving end needs to feedback to improve reliability of a system. Specifically, UE1 carries indication information in Sidelink Control Information (SCI) to indicate whether A receiving end needs to perform sidelink feedback.

Configured Grant (or Called Unlicensed Transmission)

In 3GPP Rel-15, a configured grant transmission mode is introduced in order to reduce a transmission delay of uplink data, which mainly includes two configured grant modes: type-1 configured grant and type-2 configured grant.

Type-1 configured grant: a network configures transmission resources for a terminal through a Radio Resource Control (RRC) signaling, the RRC signaling configures all transmission resources and transmission parameters including time domain resources, frequency domain resources, Demodulation Reference Signals (DMRS), power control, Modulation and Coding Scheme (MCS), Waveform, Redundant Version (RV), the number of repetitions, frequency hopping, a quantity of HARQ processes, etc. After receiving the high-layer parameters, a UE may immediately use a configured transmission parameter to perform PUSCH transmission on a configured time-frequency resource.

Type-2 configured grant: a two-step resource allocation method is adopted; firstly, transmission resources and transmission parameters including a period of a time-frequency resource, open-loop power control, waveform, redundancy version, the number of retransmissions, frequency hopping, a quantity of HARQ processes, etc. are configured by a high-layer parameter ConfiguredGrantConfig, and then PUSCH transmission of the type-2 configured grant is activated through Downlink control information (DCI), and other transmission resources and transmissions including time domain resources, frequency domain resources, DMRS, MCS, etc. are simultaneously configured. Upon receiving the high-layer parameter ConfiguredGrantConfig, a UE cannot use the resources and parameters configured through the high-layer parameter for PUSCH transmission immediately, but can only perform PUSCH transmission after receiving corresponding DCI activation and configuring other resources and transmission parameters. In addition, a network may deactivate the configuration transmission through DCI, and when a terminal receives the deactivated DCI, it can no longer use the transmission resource for transmission.

If the network allocates a transmission resource of configured grant to the terminal, when the terminal has uplink data to transmit, it may directly use the transmission resource for transmission without sending a Scheduling Request/Buffer Status Report (SR/BSR) to the network to request a transmission resource, thereby reducing a delay.

NR-V2X

In the NR-V2X, automatic driving needs to be supported, thus higher requirements are put forward for data interaction between vehicles, such as a greater throughput, a lower delay, higher reliability, a larger coverage range, and more flexible resource allocation, etc.

In an NR-V2X system, a variety of transmission modes are introduced, a mode 1 and a mode 2, in which the mode 1 is that a network allocates a transmission resource to a terminal (that is, the mode A above) and the mode 2 is that a terminal select a transmission resource (that is, the mode B above).

In the mode 1 of NR-V2X, the network may allocate a transmission resource of configured grant to the terminal, and the terminal sends sidelink data on a transmission resource allocated by the network without applying for a transmission resource from the network, thus achieving a purpose of reducing a transmission delay.

Figure 3:
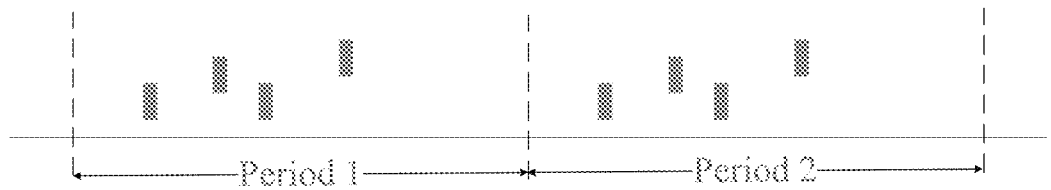
FIG. 3 is a schematic diagram of a transmission resource of configured grant according to an implementation of the present disclosure.

In sidelink configured grant, the network allocates periodic transmission resources, wherein in each period, the network may configure a plurality of transmission resources, as shown in FIG. 3: transmission resources of configured grant are periodically repeated, and four sidelink transmission resources are included in each period.

If sidelink feedback is active, a receiving end terminal sends feedback information to a transmitting end terminal according to a sidelink data receiving situation, and the transmitting end terminal reports sidelink feedback information (SL HARQ-ACK information) to the network.

In NR-V2X, for a transmission resource of configured grant allocated by a network to a terminal, if sidelink feedback transmission is supported, a transmitting end terminal reports sidelink feedback information to the network. However, it is now agreed in the standard, in each period of configured grant, the transmitting end terminal only reports 1-bit sidelink feedback information to the network. When a plurality of transmission resources in a period may be used for transmitting a plurality of sidelink data, how the terminal can report 1-bit sidelink feedback information is a problem that needs to be solved.

Figure 4:
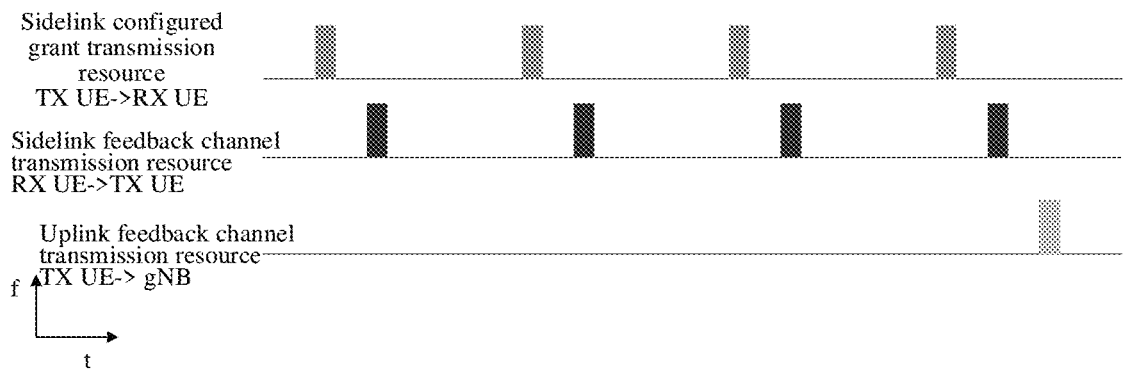
FIG. 4 is a schematic diagram of a transmission resource according to an implementation of the present disclosure.

When a plurality of transmission resources of configured grant are included in a period, each transmission resource may correspond to a sidelink feedback channel. Considering that a transmitting end terminal only reports 1-bit sidelink feedback information to a network in a period, an uplink transmission resource carrying the feedback information, such as a Physical Uplink Control Channel (PUCCH) transmission resource, may be configured after all sidelink transmission resources. As shown in FIG. 4: sidelink configured grant transmission resources in this figure are transmission resources in a period, which include four transmission resources, specifically, frequency domain starting positions of the four transmission resources may be different, time slot intervals between every two transmission resources may be different, and sizes of frequency domain resources may be the same or different. Each sidelink transmission resource has a corresponding sidelink feedback resource, thus the four sidelink transmission resources correspond to four sidelink feedback transmission resources respectively. An uplink transmission resource is included in the period for reporting sidelink feedback information to a network. Optionally, the uplink transmission resource is after a last sidelink feedback resource in the period, thus the transmitting end terminal may report sidelink feedback information to the network after receiving all sidelink feedback information.

Figure 5:
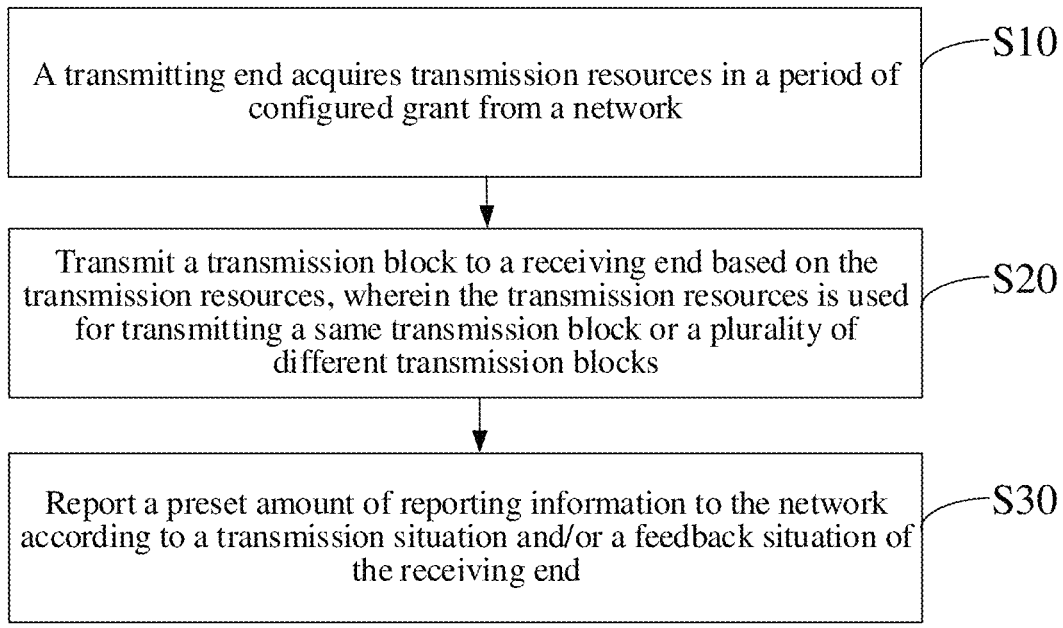
FIG. 5 is a schematic flowchart of an exemplary implementation of a method for information reporting of sidelink according to the present disclosure.

Referring to FIG. 5, FIG. 5 is a schematic flowchart of an exemplary implementation of a method for information reporting of sidelink according to the present disclosure.

In this implementation, the method for information reporting of sidelink includes following acts.

In act S10, a transmitting end acquires transmission resources in a period of configured grant from a network.

A solution of this implementation mainly relates to sidelink data transmission and information reporting under sidelink configured grant, which may be specifically applied to a Vehicle to Everything system or other Device to Device (D2D) scenarios, specifically, a transmitting end acquires transmission resources in a period of configured grant from a network; transmits a sidelink Transmission Block (TB) to a receiving end based on the transmission resources, the transmission resources being used for transmitting a same transmission block or a plurality of different transmission blocks; and reports a preset amount of reporting information to the network according to a transmission situation and/or a feedback situation of the receiving end.

In this implementation, a sidelink of a Vehicle to Everything system is taken as an example for explanation. An executive body is an information reporting terminal carried as a sidelink, and the information reporting terminal may be a vehicle-mounted terminal or another independent device. For convenience of description, the information reporting terminal of this implementation takes a "transmitting end" as an example, while another terminal that performs sidelink data interaction with the "transmitting end" may be called a "receiving end", and sidelink data transmitted by the transmitting end to the receiving end may be called a "transmission block." It may be understood that in different interaction processes, a same terminal may act as a "transmitting end" or a "receiving end". In this implementation, when the transmitting end needs to perform data interaction with the receiving end, a configured grant transmission mode is introduced in order to reduce a transmission delay of data, and the transmitting end acquires a sidelink transmission resource of configured grant from a network, and then transmits sidelink data through the sidelink transmission resource. Further, configured grant information sent by the network includes an uplink transmission resource, and the transmitting end reports information to the network through the uplink transmission resource. It should be understood that the information reported by the transmitting end to the network is used for indicating whether the sidelink data sent by the transmitting end is correctly received by the receiving end. Transmission resources acquired by the transmitting end (transmission resources of configured grant from the network) may be periodically repeated, and a plurality of sidelink transmission resources may be included in each period (each transmission resource includes a time domain resource, a frequency domain resource, etc.), and each sidelink transmission resource corresponds to different time. For example, for a transmission resource acquired by the transmitting end, there are four sidelink transmission resources at different points in time in one period. Of course, frequency domain starting positions of these sidelink transmission resources may be different, time slot intervals between every two may be different, and sizes of frequency domain resources may also be different. In each period, there are corresponding sidelink feedback resources for receiving feedback information sent by the receiving end (of course, the receiving end may not feedback). Optionally, in each period, one or more sidelink feedback resources may be included, for example, there is a corresponding sidelink feedback resource after each sidelink transmission resource, or there is a corresponding sidelink feedback resource after a last transmission resource among transmission resources in a period. In addition, in each period, there is also an uplink transmission resource for the transmitting end to report feedback information to the network. Considering that the transmitting end only reports 1-bit (or other fixed amount) information to the network in one period, thus one period may only include one uplink transmission resource, which is after a last sidelink feedback resource in the period, so that the transmitting end may report information to the network after receiving all sidelink feedback information. It is worth noting that the transmission resource acquired by the transmitting end may be of one period or a plurality of periods.

In act S20, a transmission block is transmitted to a receiving end based on the transmission resources.

In this implementation, when the transmitting end obtains the transmission resources of configured grant from the network, it may transmit a sidelink transmission block to the receiving end based on the transmission resources, that is, data interaction of sidelink may be performed. It is worth noting that there may be different transmission settings for the transmission resources obtained by the transmitting end. For example, the transmission resources of one period include a plurality of sidelink transmission resources, and these sidelink transmission resources can only be used for transmitting a same transmission block. Even if sidelink transmission of the transmission block is completed in one period, and there are still unused remaining sidelink resources in the period, these remaining sidelink resources will not be used for transmitting other transmission blocks. For another example, the transmission resources of one period include a plurality of sidelink transmission resources, which may be used for transmitting a plurality of different transmission blocks. For these different transmission blocks, a transmission mode may be a sequential transmission mode, that is, a next transmission block is transmitted after one transmission block is transmitted; or, the transmission mode may be an arbitrary transmission mode, that is, there is no definite mapping relationship between sidelink transmission resources and a plurality of different transmission blocks. Of course, in addition to the above examples, periodic transmission resources may have other transmission settings. In this implementation, the transmitting end may transmit a transmission block to the receiving end through various sidelink transmission resources based on the transmission settings of the transmission resources.

In act S30, a preset amount of reporting information is reported to a network according to a transmission situation and/or a feedback situation of the receiving end.

In this implementation, after transmitting data to the receiving end, the transmitting end will also report information to the network. However, since the reporting of information is done through an uplink transmission resource configured in sidelink configured grant information, there is no need to reapply for a transmission resource from the network, which reducing a transmission delay. It is worth noting that in some cases (such as unicast communication), when receiving data transmitted by the transmitting end, the receiving end may detect sidelink data, and perform sidelink feedback to the transmitting end according to a detection result, wherein, content of the feedback includes Acknowledgment (ACK) or Negative Acknowledgment (NACK). For convenience of description, the Acknowledgment (ACK) sent (fed back) by the receiving end is subsequently referred to as "acknowledgment feedback information" and the Negative Acknowledgment (NACK) sent (fed back) by the receiving end is subsequently referred to as "negative acknowledgment feedback information", that is, the send end will receive feedback from the receiving end after sidelink transmission Of course, in some cases (such as broadcast communication), when the receiving end receives data transmitted by the transmitting end and does not need to give feedback, that is, the transmitting end will not receive feedback from the receiving end after sidelink transmission. Therefore, when reporting information, the transmitting end may determine information content to be reported in a period according to an actual transmission situation of sidelink transmission and/or a feedback situation of the receiving end, and then report corresponding information to the network through an uplink transmission resource. Wherein, the transmission situation includes whether a transmission block supports sidelink feedback, a number of transmissions of the transmission block, a transmission delay, etc., and the feedback situation of the receiving end includes whether the transmitting end receives feedback information from the receiving end, a type of received feedback information (whether the received feedback information is acknowledgment feedback information ACK or negative acknowledgment feedback information NACK); when the transmitting end is reporting, it reports once every period, and an amount of reporting information is preset, such as 1 bit. Reported content includes Acknowledgment (ACK) or Negative Acknowledgment (NACK). In order to distinguish from feedback information sent by the receiving end, the Acknowledgment (ACK) reported by the transmitting end to the network is subsequently referred to as "acknowledgment reporting information" and the Negative Acknowledgment (NACK) reported by the transmitting end to the network is subsequently referred to as "negative acknowledgment reporting information".

In this implementation, a transmitting end obtains transmission resources in a period of configured grant from a network; transmits a transmission block to a receiving end based on the transmission resources, the transmission resources being used for transmitting a same transmission block or a plurality of different transmission blocks; and reports a preset amount of reporting information to the network according to a transmission situation and/or a feedback situation of the receiving end. In this way, in this implementation, the transmitting end may transmit sidelink data to the receiving end based on the obtained transmission resources of the period, and a same transmission block or a plurality of different transmission blocks may be transmitted in each period, which enriches transmission modes; in addition, in this period, the transmitting end will also report a fixed amount of information according to an actual transmission situation and/or a feedback situation of the receiving end, so as to feed back a situation of sidelink transmission to the network, which improves an information reporting process under transmission resources, facilitating improving integrity and stability of sidelink transmission.

It is worth noting that the transmission resources of configured grant exemplified in this implementation include a plurality of sidelink transmission resources in one period, so they may be used for sidelink transmission of a same transmission block or a plurality of different transmission blocks. In practice, there may be only one sidelink transmission resource of configured grant in one period. When there is only one sidelink transmission resource in a period, a transmitting end may only perform sidelink transmission of one transmission block at most in this period. Of course, it should be understood that if the transmission resources in this period also include a sidelink feedback resource and an uplink feedback resource, a corresponding reporting operation may also be performed based on the sidelink feedback resource and uplink feedback resource, and a reporting mode may be the same as that of transmitting a same transmission block in this implementation and subsequent implementations, and details will not be repeated here.

A second implementation of the method for information reporting of sidelink of the present disclosure is proposed based on the implementation shown in FIG. 5 above.

In this implementation, the transmission resources are used for transmitting a same transmission block, and the act S20 includes: repeatedly transmitting a same transmission block to the receiving end based on the transmission resources, wherein the same transmission block sent by the transmitting end to the receiving end does not support sidelink feedback.

After the act S20, the method further includes: stopping transmission when a number of transmissions of the same transmission block reaches a first threshold or a maximum delay of data is reached.

In this implementation, the transmitting end obtains configured grant transmission resources configured by the network, and a plurality of sidelink transmission resources are included in each period, and the plurality of sidelink transmission resources of a period can only be used for transmitting a same transmission block. Even if sidelink transmission of the transmission block is completed in a period, and there are still unused remaining sidelink resources in the period, these remaining sidelink resources will not be used for transmitting another transmission block. In this implementation, when a transmitting end performs sidelink transmission through the plurality of sidelink transmission resources, a transmitted transmission block does not support sidelink feedback, or the sidelink feedback is in a deactivated state, and the transmitting end performs blind retransmission. When transmitting a transmission block through a sidelink transmission resource, the transmitting end does not need feedback from the receiving end and may automatically perform retransmission, that is, the transmitting end may repeatedly transmit a same transmission block to the receiving end through a sidelink transmission resource. Optionally, a corresponding threshold of a maximum number of transmissions (hereinafter referred to as "a first threshold" for short) or a corresponding maximum delay of data is preset for a transmission block, when a number of transmissions of the transmission block reaches the first threshold or a maximum delay of data is reached, transmission of the transmission block may be stopped. For example, transmission resources of one period for which the transmitting end has obtained configured grant include four sidelink transmission resources, and a maximum number of transmissions of a transmission block that needs to be transmitted is six, then the transmitting end uses the four sidelink transmission resources in this period to transmit the transmission block (including one first transmission and three retransmissions) in a first transmission period, and in a next period, first two sidelink transmission resources are used for continuing to transmit the transmission block, and after reaching six transmissions, the transmission block is no longer transmitted, and remaining two sidelink transmission resources in this period are not used for transmitting other data.

Further, the act S30 includes: reporting a preset amount of acknowledgment reporting information to the network in a period.

In this implementation, since the transmitting end does not need feedback from the receiving end and may automatically retransmit data when performing sidelink transmission by means of blind retransmission, the transmitting end may directly report information to the network in a period. When reporting, the transmitting end reports once every period, reported content is acknowledgment reporting information (ACK), and an amount of the acknowledgment reporting information (ACK) should meet a preset amount (1 bit) for the network to obtain a sidelink transmission state.

In this way, the transmitting end may transmit a same transmission block by means of blind transmission through the transmission resources, and according to a preset amount of acknowledgment reporting information reported in each period, a sidelink transmission and information reporting process under the transmission resources is improved, which is conducive to improving integrity and stability of sidelink transmission.

A third implementation of the method for information reporting of sidelink of the present disclosure is proposed based on the implementation shown in FIG. 5 above.

In this implementation, the transmission resources are used for transmitting a same transmission block, and the act S20 further includes: transmitting a same transmission block to the receiving end based on the transmission resources, wherein the same transmission block sent by the transmitting end to the receiving end supports sidelink feedback.

In this implementation, the transmitting end obtains configured grant transmission resources configured by the network, and a plurality of sidelink transmission resources are included in each period, and at least one sidelink feedback resource is also included in each period, while the plurality of sidelink transmission resources of a period can only be used for transmitting a same transmission block. Even if sidelink transmission of the transmission block is completed in one period, and there are still unused remaining sidelink resources in the period, these remaining sidelink resources will not be used for transmitting another transmission block. In this implementation, when the transmitting end performs sidelink transmission through the transmission resources, a transmitted transmission block supports sidelink feedback, or the sidelink feedback is in an active state, and the transmitting end performs based on a mode of sidelink feedback. When transmitting a transmission block through a sidelink transmission resource, the transmitting end will determine, according to feedback information of the receiving end, whether to retransmit or not. Specifically, the transmitting end will first transmit a transmission block to the receiving end through one sidelink transmission resource, and then try to acquire feedback from the receiving end through a sidelink feedback resource.

After the act S20, the method further includes: detecting whether acknowledgment feedback information fed back by the receiving end is received; and stopping transmission if the acknowledgment feedback information fed back by the receiving end is received.

In this implementation, if the receiving end receives a transmission block transmitted by the transmitting end through a sidelink transmission resource, it may detect the transmission block, and if it is confirmed that data has been correctly received after detection, the receiving end will feed back corresponding acknowledgment feedback information (ACK) to the transmitting end through a sidelink feedback resource. When the transmitting end receives the acknowledgment feedback information, it may be known that the transmission block has been correctly received by the receiving end, and at this time, sidelink transmission of data is stopped (even if there is an unused sidelink transmission resource in this transmission period, it will not be used for transmitting another transmission block).

If the acknowledgment feedback information fed back by the receiving end is not received, continuing performing the act of transmitting the transmission block to the receiving end based on the transmission resources.

In this implementation, if the receiving end receives a transmission block transmitted by the transmitting end through a sidelink transmission resource, it may detect the transmission block, and if data is found to be missing (or other abnormalities) after detection, it will feed back corresponding negative acknowledgment feedback information (NACK) to the transmitting end through a sidelink feedback resource. In addition, if the receiving end fails to receive the transmission block sent by the transmitting end (for example, a sidelink transmission process may be abnormal), the receiving end will not feedback to the transmitting end. When the transmitting end does not receive the acknowledgment feedback information (ACK) from the receiving end, but receives negative acknowledgment feedback information (NACK) or does not receive feedback, it may be considered that last transmission was not completed. At this time, the transmitting end will continue to transmit the transmission block to the receiving end through a next sidelink transmission resource until acknowledgment feedback information (ACK) is received.

Further, the act S30 includes: detecting whether acknowledgment feedback information fed back by the receiving end is received in a period; and reporting a preset amount of acknowledgment reporting information to the network if the acknowledgment feedback information from the receiving end is received in the period.

In this implementation, since the transmitting end needs to determine whether data retransmission is needed according to a feedback situation of the receiving end after performing sidelink transmission, the transmitting end may further determine content of information reporting in the period according to the feedback situation of the receiving end in the period. Specifically, if the transmitting end may detect whether acknowledgment feedback information fed back by the receiving end is received in the period; if the acknowledgment feedback information sent by the receiving end is received in the period, acknowledgment reporting information (ACK) may be reported to the network through an uplink transmission resource of transmission resources in the period, and the acknowledgment reporting information (ACK) should conform to preset information amount (such as 1 bit).

If the acknowledgment feedback information from the receiving end is not received in the period, a preset amount of negative acknowledgment reporting information is reported to the network.

In this implementation, if the transmitting end does not receive acknowledgment feedback information (for example, receives negative acknowledgment feedback information or does not receive feedback) sent by the receiving end in the period, negative acknowledgment reporting information (NACK) may be reported to the network through an uplink transmission resource of the period, and the negative acknowledgment reporting information (NACK) should conform to preset information amount (such as 1 bit).

In this way, the transmitting end may transmit a same transmission block in a form of sidelink feedback through transmission resources, and report a preset amount of information according to a feedback situation in each period. A sidelink transmission and information reporting process under the transmission resources is improved, which is conducive to improving integrity and stability of sidelink transmission.

A fourth implementation of the method for information reporting of sidelink of the present disclosure is proposed based on the implementation shown in FIG. 5 above.

In this implementation, the transmission resources are used for transmitting a plurality of different transmission blocks, wherein the plurality of different transmission blocks include a first transmission block and a second transmission block; and the act S20 further includes: transmitting a first transmission block to the receiving end based on the transmission resources.

In this implementation, the transmitting end obtains configured grant transmission resources configured by the network, and each period includes a plurality of sidelink transmission resources, and each sidelink transmission resource is followed by a sidelink feedback resource, or a group of sidelink transmission resources is followed by a sidelink feedback resource. However, a plurality of sidelink transmission resources of one period may be used for transmitting a plurality of different transmission blocks. For convenience of description, multiple different transmission blocks in this implementation are described in a manner of a first transmission block and a second transmission block. It should be understood that in practice, more transmission blocks may be included. When acquiring a plurality of sidelink transmission resources in one period, the transmitting end will first transmit the first transmission block to the receiving end through the plurality of sidelink transmission resources. A transmission mode of the first transmission block may be either a blind transmission mode or a sidelink feedback mode. Specific introduction of related modes of blind transmission and sidelink feedback may be refer to the above-mentioned second and third implementations, and details will not be repeated here.

If acknowledgment feedback information from the receiving end for the first transmission block is received or a number of transmissions of the first transmission block reaches a second threshold, and there is an unused remaining resource in the transmission resources, the second transmission block is transmitted to the receiving end based on the remaining resource.

In this implementation, when it is detected that transmission of the first transmission block is completed, the transmitting end will not immediately stop the transmission, but will detect whether there is an unused remaining sidelink resource in the transmission resources of the period that may be used for transmitting another transmission block. Among them, a mode for detecting whether the transmission of the first transmission block is completed or not may be determined according to a specific transmission mode of the first transmission block. For example, if acknowledgment feedback information (ACK) for the first transmission block is received, or a number of transmissions of the first transmission block reached a second threshold (a maximum number of transmissions), or a transmission delay of the first transmission block reaches a maximum delay, it may be considered that transmission of the first transmission block is completed.

In this implementation, if the transmitting end detects that there is an unused remaining sidelink transmission resource in the transmission resources of the period when transmission of the first transmission block is completed, it may transmit the second transmission block to the receiving end based on these remaining sidelink transmission resources. In other words, in this implementation, a plurality of transmission blocks are transmitted sequentially, and the second transmission block (the next transmission block) will be transmitted only when the transmission of the first transmission block is completed and there is a remaining transmission resource. However, if it is detected that there are no unused remaining sidelink resource in the transmission resources of the period, sidelink transmission of the period is stopped.

Further, the act S30 further includes: if the first transmission block and the second transmission block are transmitted in the period, a preset amount of reporting information is reported to the network according to a transmission situation of the second transmission block and/or a feedback situation of the receiving end for the second transmission block.

In this implementation, since the transmitting end may transmit one transmission block or a plurality of transmission blocks in one period, the transmitting end may detect an actual transmission situation in a period, and detect whether the first transmission block and the second transmission block are transmitted in the period, then determine content of information reporting based on a detection result. Since the second transmission block can be transmitted only when transmission of the first transmission block is completed and a remaining transmission resource is available, if the transmitting end transmits the first transmission block and the second transmission block in the period, content of information reporting may be determined according to a specific transmission situation of the second transmission block or a feedback situation of the receiving end for the second transmission block. It is worth noting that if the transmitting end transmits more than three transmission blocks in one period (here, "more than" includes this number, the same below), content of information reporting may be determined according to a specific transmission situation of a last transmission block or a feedback situation of the receiving end for the last transmission block. However, if only the first transmission block is transmitted by the transmitting end in the period, content of information reporting may be determined according to a transmission situation of the first transmission block or a feedback situation of the receiving end for the first transmission block. At this time, the determining of the content of information reporting may be referred to the contents of the second implementation and the third implementation, that is, if a transmission mode of blind retransmission is used for the first transmission block, a preset amount of acknowledgment reporting information may be reported, while if a transmission mode of sidelink feedback is used for the first transmission block, content of information reporting may be determined according to whether acknowledgment feedback information is received or not, and a specific process will not be repeated here.

Furthermore, if the transmitting end transmits the first transmission block and the second transmission block in the period, content of information reporting is determined in different ways according to whether the second transmission block supports sidelink feedback.

Optionally, if the second transmission block does not support sidelink feedback, a preset amount of acknowledgment reporting information is reported to the network.

In this implementation, if the second transmission block does not support sidelink feedback, it may be considered that a blind retransmission-like mode is used for the second transmission block. At this time, the transmitting end may directly perform information reporting to the network, and when reporting, reporting information should meet a preset amount (such as 1 bit), and reported content is acknowledgment reporting information (ACK).

Optionally, if the second transmission block supports sidelink feedback, determining whether acknowledgment feedback information from the receiving end for the second transmission block is received in the period; if the acknowledgment feedback information from the receiving end for the second transmission block is received in the period, reporting a preset amount of acknowledgment reporting information to the network; and if the acknowledgment feedback information from the receiving end for the second transmission block is not received in the period, reporting a preset amount of negative acknowledgment reporting information to the network.

In this implementation, if the second transmission block supports sidelink feedback, the transmitting end may determine reported content according to feedback information for the second transmission block received in the period. If acknowledgment feedback information (ACK) from the receiving end for the second transmission block is received in the period, it may be considered that the second transmission block has been correctly received, and the transmitting end may report a preset amount (such as 1 bit) of acknowledgment reporting information (ACK) to the network in the period. However, if no acknowledgment feedback information from the receiving end for the second transmission block is received in the period (for example, negative acknowledgment feedback information is received or no feedback is received), it may be considered that the second transmission block has not been received correctly, and at this time, a preset amount (such as 1 bit) of negative acknowledgment reporting information (NACK) of this period may be reported to the network.

Optionally, if the second transmission block supports sidelink feedback, a preset amount of acknowledgment reporting information is reported to the network when a number of transmissions of the second transmission block reaches a third threshold or a maximum time delay of the second transmission block is reached.

In this implementation, if the second transmission block supports sidelink feedback, reported content may also be determined according to a transmission situation of the second transmission block. When a number of transmissions of the second transmission block reaches a third threshold (a maximum number of transmissions) or a maximum time delay of the second transmission block is reached, a preset amount (such as 1 bit) of acknowledgment reporting information (ACK) of the period may be reported to the network.

In this way, the transmitting end may transmit a plurality of transmission blocks through the transmission resources, and report a preset amount of reporting information in each period according to an actual transmission situation. A sidelink transmission and information reporting process under the transmission resources is improved, which is conducive to improving integrity and stability of sidelink transmission.

A fifth implementation of the method for information reporting of sidelink of the present disclosure is proposed based on the implementation shown in FIG. 5 above.

In this implementation, the transmission resources are used for transmitting a plurality of different transmission blocks, there is no correspondence between each transmission resource and each transmission block in the transmission resources, and the act S20 further includes: transmitting a plurality of different transmission blocks to the receiving end through each transmission resource.

In this implementation, the transmitting end obtains configured grant transmission resources configured by the network, and a plurality of sidelink transmission resources are included in one period, and at least one sidelink feedback resource are also included in each period. However, a plurality of sidelink transmission resources of one period may be used for transmitting a plurality of different transmission blocks. Compared with the fourth implementation, various transmission blocks in this implementation are not limited to sequential transmission. For example, transmission resources of one period include four sidelink transmission resources, in which the first and third sidelink transmission resources are used for transmitting a first transmission block, and the second and fourth sidelink transmission resources are used for transmitting a second transmission block. Or, the first and second sidelink transmission resources are used for transmitting the first transmission block, and the third and fourth sidelink transmission resources are used for transmitting the second transmission block. When performing sidelink transmission, the transmitting end will transmit a plurality of transmission blocks to the receiving end through each transmission resource respectively. For example, when a first transmission resource in one period is used for transmitting a first transmission block, regardless the receiving end receives correctly or not, the transmitting end may transmit a second transmission block on a second transmission resource. If the first transmission block is not correctly received by the receiving end and the second transmission block is correctly received, the transmitting end may continue to transmit the first transmission block using the third transmission resource, and if the first transmission block has not been correctly received, it may continue to transmit the first transmission block using the fourth transmission resource.

Further, the transmitting end may determine content of information reporting according to a feedback situation of a plurality of transmission blocks.

Optionally, the act S30 includes: acquiring feedback information from the receiving end for the plurality of transmission blocks in a period, and a binding processing is performed on the feedback information of the plurality of transmission blocks.

The transmitting end may obtain feedback information from the receiving end for the plurality of transmission blocks in a period, and binding the feedback information of the plurality of transmission blocks. Among them, for different transmission blocks, feedback information received by the transmitting end may be the same or different, for example, in a period, the transmitting end receives acknowledgment feedback information (ACK) for a first transmission block and receives negative acknowledgment feedback information (NACK) for a second transmission block. When a binding processing is performed on the feedback information is bound, if all feedback information is acknowledgment feedback information (ACK), then a result after the binding processing is acknowledgment reporting information (ACK) which meets a preset amount (1 bit). However, if there is at least one piece of negative acknowledgment feedback information (NACK) in the feedback information, a result after the binding processing is negative acknowledgment reporting information (NACK) which meets a preset amount (1 bit). In addition, if the transmitting end does not receive corresponding feedback information through a next sidelink feedback resource after transmitting a transmission block through a sidelink transmission resource, current feedback of the transmission block is set as negative acknowledgment feedback information (NACK) and is performed a binding processing with other feedback information.

A preset amount of reporting information is reported to the network according to a result of a binding processing.

When a result of a binding processing of feedback information of each transmission block is obtained, the transmitting end may report to the network according to the result of the binding processing.

Optionally, the act S30 further includes: acquiring feedback information from the receiving end for the plurality of transmission blocks in a period, and acquiring priorities of the plurality of transmission blocks.

In practice, a plurality of transmission blocks transmitted by the transmitting end in a same period may have different importance, which may be characterized by priority, that is, the transmission blocks have priority attributes, and priorities of different transmission blocks may be the same or different. When performing information reporting, reported content may also be determined based on a feedback situation of a transmission block with a high priority, so that the network may know a transmission situation of an important transmission block. Specifically, the transmitting end may obtain feedback information from the receiving end for the plurality of transmission blocks in a period, and obtain priorities of the plurality of transmission blocks.

Target feedback information is determined in the feedback information for the plurality of transmission blocks according to the priorities of the plurality of transmission blocks, and a preset amount of reporting information is reported to the network according to the target feedback information.

The transmitting end may determine target feedback information in feedback information of a plurality of transmission blocks according to priorities of a plurality of transmission blocks, and report a preset amount of reporting information of a period to the network according to the target feedback information. For example, the priorities of transmission blocks include a high priority and a low priority. In one period, the transmitting end transmits a first transmission block and a second transmission block, a priority of the first transmission block is a high priority, and a priority of the second transmission block is a low priority; the transmitting end may determine feedback information of the first transmission block with a high priority as target feedback information, and determine content to be reported according to the target feedback information. If the feedback information of the first transmission block is acknowledgment feedback information (ACK), a preset amount (1 bit) of acknowledgment reporting information (ACK) is to be reported in a period; while if the feedback information of the first transmission block is negative acknowledgment feedback information (NACK), a preset amount (1 bit) of negative acknowledgment reporting information is to be reported in a period.

It should be understood that the above-mentioned examples of reporting ways may also be reasonably combined according to an actual situation to obtain other ways. For example, the act S30 further includes: the transmitting end acquires feedback information of the receiving end for a plurality of transmission blocks in one period, and determines whether there is only acknowledgment feedback information (ACK) in the feedback information of the plurality of transmission blocks. If there is only acknowledgment feedback information, a preset amount (1 bit) of acknowledgment reporting information (ACK) may be reported to the network. However, if there is at least one piece of negative acknowledgment feedback information (NACK) in the feedback information, a quantity of negative acknowledgment feedback information may be further determined. If there is only one piece of negative acknowledgment feedback information is, a preset amount (1 bit) of negative acknowledgment reporting information (NACK) may be reported according to the only piece of negative acknowledgment feedback information; if there are two pieces of negative acknowledgment feedback information, target negative acknowledgment feedback information may be determined according to priorities of transmission blocks, and then a preset amount (1 bit) of negative acknowledgment reporting information (NACK) is reported to the network according to the target negative acknowledgment feedback information, that is, information reporting is performed according to negative acknowledgment feedback information of a transmission block with a highest (or lowest) priority.

In this way, the transmitting end may transmit a plurality of transmission blocks through the transmission resources, and determine a preset amount of reporting information in each period according to feedback information of each transmission block. A sidelink transmission and information reporting process under the transmission resources is improved, which is conducive to improving integrity and stability of sidelink transmission.

A sixth implementation of the method for information reporting of sidelink of the present disclosure is proposed based on the implementation shown in FIG. 5 above.

In this implementation, the act S30 further includes: the transmitting end reports a preset amount of acknowledgment reporting information to the network in a period if the transmitting end does not transmit a transmission block to the receiving end based on the transmission resources.

The transmitting end obtains transmission resources of configured grant from a network and may transmit a sidelink transmission block to the receiving end based on the transmission resources; however, the sidelink transmission block may not be transmitted through the transmission resources, and at this time, the transmitting end still needs to report to the network. Specifically, in this implementation, after acquiring transmission resources in a period of configured grant from a network, if the transmitting end does not transmit a sidelink transmission block to the receiving end based on the transmission resources (no sidelink data is transmitted), the transmitting end will report a preset amount (1 bit) of acknowledgment reporting information (ACK) to the network through an uplink transmission resource in a period, so as to inform the network that there is no need to allocate a retransmission resource.

In this way, if the transmitting end does not perform sidelink transmission based on the transmission resources, it will report a preset amount of acknowledgment reporting information in this period, so as to inform the network that there is no need to redistribute a retransmission resource, which improves an information reporting process under transmission resources, facilitating improving integrity and stability of sidelink transmission.

It should be noted that the above-mentioned implementations may also be implemented in a reasonable combination according to an actual situation, which will not be repeated here for brevity.

In addition, the present disclosure further provides an apparatus for information reporting of sidelink.

Figure 6:
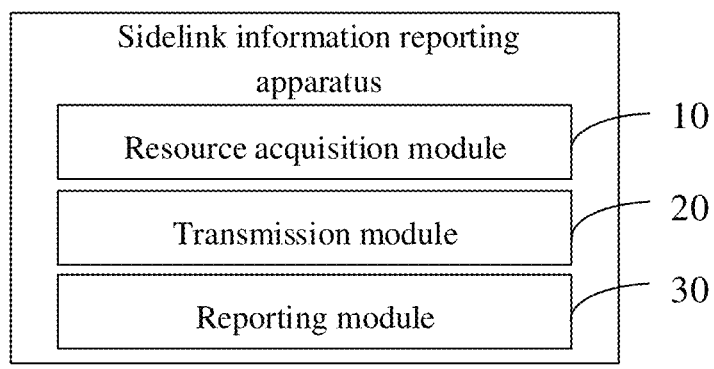
FIG. 6 is a schematic diagram of functional modules of an apparatus for information reporting of sidelink according to the present disclosure.

As shown in FIG. 6, the apparatus for information reporting of sidelink of the present disclosure includes: a resource acquisition module 10 configured to acquire transmission resources in a period of configured grant from a network; a transmission module 20 configured to transmit a transmission block to a receiving end based on the transmission resources, the transmission resources being used for transmitting a same transmission block or a plurality of different transmission blocks; and a reporting module 30 configured to report a preset amount of reporting information to the network according to a transmission situation and/or a feedback situation of the receiving end.

In an implementation, the transmission resources are used for transmitting a same transmission block, the transmission module is further configured to, repeatedly transmit a same transmission block to the receiving end based on the transmission resources, wherein the same transmission block sent to the receiving end does not support sidelink feedback.

The apparatus for information reporting further includes: a stopping module configured to, stop transmission when a number of transmissions of the same transmission block reaches a first threshold or a maximum delay of data is reached.

In an implementation, the reporting module is specifically configured to: report a preset amount of acknowledgment reporting information to the network in a period.

In an implementation, the transmission resources are used for transmitting a same transmission block, the transmission module is further configured to, transmit a same transmission block to the receiving end based on the transmission resources, wherein the same transmission block sent to the receiving end supports sidelink feedback.

The apparatus for information reporting further includes: a detection module configured to detect whether acknowledgment feedback information fed back by the receiving end is received; a stopping module configured to, stop transmission if the acknowledgment feedback information fed back by the receiving end is received; the transmission module is further configured to, transmit a transmission block to the receiving end based on the transmission resources if the acknowledgment feedback information fed back by the receiving end is not received.

In an implementation, the reporting module is specifically configured to: detect whether acknowledgment feedback information fed back by the receiving end is received in a period; if the acknowledgment feedback information of the receiving end is received in the period, report a preset amount of acknowledgment reporting information to the network; if the acknowledgment feedback information of the receiving end is not received in the period, report a preset amount of negative acknowledgment reporting information to the network.

In an implementation, the transmission resources are used for transmitting a plurality of different transmission blocks, wherein the plurality of different transmission blocks include a first transmission block and a second transmission block.

The transmission module is further configured to transmit the first transmission block to the receiving end based on the transmission resources; if acknowledgment feedback information from the receiving end for the first transmission block is received or a number of transmissions of the first transmission block reaches a second threshold, and there is an unused remaining resource in the transmission resources, transmit the second transmission block to the receiving end based on the remaining resource.

In an implementation, the reporting module is further specifically configured to: if the first transmission block and the second transmission block are transmitted in a period, report a preset amount of reporting information to the network according to a transmission situation of the second transmission block and/or a feedback situation of the receiving end for the second transmission block.

In an implementation, the reporting module is further specifically configured to: if the second transmission block does not support sidelink feedback, report a preset amount of acknowledgment reporting information to the network.

In an implementation, the reporting module is further specifically configured to: if the second transmission block supports sidelink feedback, determine whether acknowledgment feedback information of the receiving end for the second transmission block is received in a period; if the acknowledgment feedback information of the receiving end for the second transmission block is received in the period, report a preset amount of acknowledgment reporting information to the network; and if the acknowledgment feedback information of the receiving end for the second transmission block is not received in the period, report a preset amount of negative acknowledgment reporting information to the network.

In an implementation, the transmission resources are used for transmitting a plurality of different transmission blocks, and the reporting module is further specifically configured to acquire feedback information of the receiving end for the plurality of transmission blocks in a period, and perform a binding processing on the feedback information of the plurality of transmission blocks; and report a preset amount of reporting information to the network according to a result of the binding processing.

In an implementation, the transmission resources are used for transmitting a plurality of different transmission blocks, and the reporting module is further specifically configured to acquire feedback information of the receiving end for the plurality of transmission blocks in a period, and acquire priorities of the plurality of transmission blocks; determine target feedback information in the feedback information for the plurality of transmission blocks according to the priorities of the transmission blocks, and report a preset amount of reporting information to the network according to the target feedback information.

In an implementation, the reporting module is further specifically configured to: if a transmission block is not transmitted to the receiving end based on the transmission resources, report a preset amount of acknowledgment reporting information to the network in a period.

Among them, functional realization of each module in the apparatus for information reporting of sidelink corresponds to that in each implementation of the method for information reporting of sidelink, and at least has all beneficial effects brought by all the technical solutions of all the above implementations, which will not be repeated here.

Figure 7:
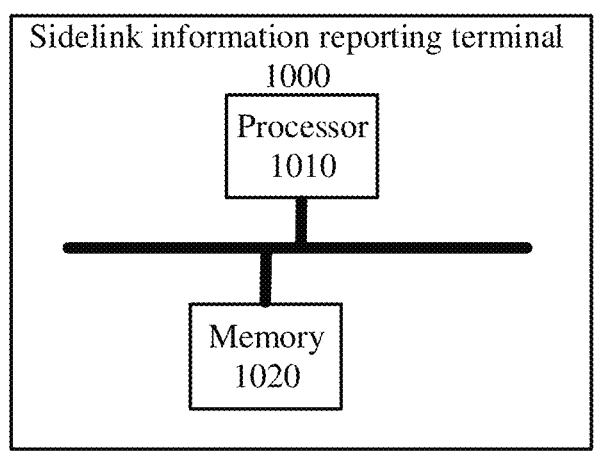
FIG. 7 is a schematic diagram of a structure of a terminal for information reporting of sidelink according to the present disclosure.

In addition, referring to FIG. 7, FIG. 7 is a schematic diagram of hardware architecture of a terminal for information reporting of sidelink of the present disclosure. The sidelink information reporting terminal 1000 may be a device capable of performing Device to Device (D2D) communication, such as a vehicle-mounted terminal, a mobile phone, and a tablet computer, or may be an independent apparatus carried on the above devices. The terminal for information reporting of sidelink 1000 may include a processor 1010 and a memory 1020. In addition, it may also include an input and output component, a communication component, etc. The input and output component is used for displaying a data transmission state, and may also be used for detecting an operation input of a user. The communication component may include a WIFI component, a mobile communication component, etc., data interaction with a (base station) network and another equipment terminal may be performed through the communication component. The memory 1020 stores an operating system and a computer program, wherein the acts of the method for information reporting of sidelink are performed when the computer program in the memory 1020 is executed by the processor 1010.

Since all the technical solutions of all the foregoing implementations are adopted when the computer program stored in the memory of the terminal for information reporting of sidelink is executed by the processor, the terminal for information reporting of sidelink has at least all beneficial effects brought by all the technical solutions of all the foregoing implementations, and will not be repeated here.

In addition, the present disclosure further provides a readable storage medium, which may be a non-transitory readable storage medium. A computer program is stored on the readable storage medium, and the acts of the method for information reporting of sidelink as described above are implemented when the computer program is executed by a processor.

Since all the technical solutions of all the foregoing implementations are adopted when the computer program stored in the readable storage medium is executed by the processor, the readable storage medium has at least all the beneficial effects brought by all the technical solutions of all the foregoing implementations, and will not be repeated here.

Compared with the prior art, according to the method, apparatus, and terminal for information reporting of sidelink, and the readable storage medium according to the implementations of the present disclosure, the transmitting end may transmit sidelink data to the receiving end based on acquired transmission resources, and a same transmission block or a plurality of different transmission blocks may be transmitted in each period, which enriches transmission modes. In addition, in this period, the transmitting end may also report a fixed amount of information according to an actual transmission situation and/or a feedback situation of the receiving end, so as to feed back a state of sidelink transmission to the network, which improves an information reporting process under transmission resources, facilitating improving integrity and stability of sidelink transmission.

It should be noted that the terms "include", "contain" or any other variation thereof herein are intended to cover non-exclusive inclusion, such that a process, method, article, or system that includes a list of elements not only includes those elements but also includes other elements not expressly listed, or further includes elements inherent to such process, method, article, or system. An element defined by a statement "include one . . . " does not exclude presence of additional identical elements in a process, method, article or system that includes the element, without more limitations.

The above-mentioned serial numbers of the implementations of the present disclosure are only for description, and do not represent superiority and inferiority of the implementations.

Through the description of the above implementations, those skilled in the art may clearly understand that the methods according to the above implementations may be implemented by means of software plus necessary general hardware platform, and of course they may also be implemented through hardware, but the former are better implementations in many cases. Based on such understanding, the technical schemes of the implementations of the present disclosure, in essence, or the part contributing to the prior art, may be embodied in a form of a software product, and the computer software product is stored in an above-mentioned storage medium (such as a ROM/RAM, a magnetic disk, and an optical disk), including several instructions for enabling a terminal device (which may be a mobile phone, a computer, a server, a controlled terminal, or a network device) to perform the method described in each implementation of the present disclosure.

The above are only preferred implementations of the present disclosure, which do not limit the patent scope of the present disclosure. Any equivalent structure or equivalent flow transformation made by using the description and drawings of the present disclosure, directly or indirectly applied in other related technical fields, are equally included in the patent protection scope of the present disclosure.

The invention claimed is:

1. A method for reporting sidelink information, comprising:
    acquiring, by a transmitting terminal device, transmission resources in a period of configured grant from a network device; wherein the transmission resources are used for sidelink transmission of a same transmission block; and
    reporting, by the transmitting terminal device, a preset amount of reporting information to the network device according to a transmission situation and/or a feedback information of the sidelink transmission from a receiving terminal device;
    wherein when the same transmission block transmitted by the transmitting terminal device to the receiving terminal device does not support sidelink feedback, transmitting the same transmission block repeatedly to the receiving terminal device based on the transmission resources; and
    stopping transmission when a number of transmissions of the same transmission block reaches a first threshold or a maximum delay of data is reached;
    wherein reporting the preset amount of reporting information to the network according to the transmission situation and/or the feedback information of the sidelink transmission from the receiving terminal device comprises:
    reporting a preset amount of acknowledgment reporting information to the network device in the period.

2. The method of claim 1, wherein reporting the preset amount of reporting information to the network device according to the transmission situation further comprises:
    reporting, by the transmitting terminal device, a preset amount of acknowledgment reporting information to the network device in the period if the transmitting terminal device does not transmit the transmission block to the receiving terminal device based on the transmission resources.

3. The method of claim 1, wherein when the same transmission block transmitted by the transmitting terminal device to the receiving terminal device supports sidelink feedback, transmitting the same transmission block to the receiving terminal device based on the transmission resources;
    detecting whether acknowledgment feedback information fed back by the receiving terminal device is received;
    stopping transmission if the acknowledgment feedback information fed back by the receiving terminal device is received;
    continuing performing the transmitting the transmission block to the receiving terminal device based on the transmission resources if the acknowledgment feedback information fed back by the receiving terminal device is not received.

4. The method of claim 3, wherein reporting the preset amount of reporting information to the network device according to the transmission situation and/or the feedback information of the sidelink transmission from the receiving terminal device further comprises:
    detecting whether acknowledgment feedback information fed back by the receiving terminal device is received in the period;
    reporting a preset amount of acknowledgment reporting information to the network device if the acknowledgment feedback information from the receiving terminal device is received in the period;

reporting a preset amount of negative acknowledgment reporting information to the network device if the acknowledgment feedback information from the receiving terminal device is not received in the period.

5. A transmitting terminal device, comprising: a memory, a processor, and a computer program stored in the memory and executable by the processor, and following acts are implemented when the computer program is executed by the processor:

acquiring transmission resources in a period of configured grant from a network device, wherein the transmission resources are used for sidelink transmission of a same transmission block; and reporting a preset amount of reporting information to the network device according to a transmission situation and/or feedback information of the sidelink transmission from a receiving device of the sidelink transmission;

wherein when the same transmission block transmitted by the transmitting terminal device to the receiving terminal device does not support sidelink feedback, transmitting the same transmission block repeatedly to the receiving terminal device based on the transmission resources; and stopping transmission when a number of transmissions of the same transmission block reaches a first threshold or a maximum delay of data is reached;

wherein reporting the preset amount of reporting information to the network according to the transmission situation and/or the feedback information of the sidelink transmission from the receiving terminal device comprises:

reporting a preset amount of acknowledgment reporting information to the network device in the period.

6. The terminal device of claim 5, wherein reporting the preset amount of reporting information to the network device according to the transmission situation further comprises:

reporting a preset amount of acknowledgment reporting information to the network device in the period if the terminal device does not transmit the transmission block to the receiving device based on the transmission resources.

7. The terminal device of claim 5, wherein when the same transmission block transmitted by the transmitting terminal device to the receiving terminal device supports sidelink feedback, transmitting the same transmission block to the receiving device based on the transmission resources; and following acts are implemented when the computer program is executed by the processor:

detecting whether acknowledgment feedback information fed back by the receiving device is received;

stopping transmission if the acknowledgment feedback information fed back by the receiving device is received; and continuing performing the act of transmitting the transmission block to the receiving device based on the transmission resources if the acknowledgment feedback information fed back by the receiving device is not received.

8. The terminal device of claim 7, wherein reporting the preset amount of reporting information to the network device according to the transmission situation and/or the feedback information of the sidelink transmission from the receiving device further comprises:

detecting whether acknowledgment feedback information fed back by the receiving device is received in the period;

reporting a preset amount of acknowledgment reporting information to the network device if the acknowledgment feedback information from the receiving device is received in the period;

reporting a preset amount of negative acknowledgment reporting information to the network device if the acknowledgment feedback information from the receiving device is not received in the period.

9. A network device, comprising: a memory, a processor, and a computer program stored in the memory and executable by the processor, and following acts are implemented when the computer program is executed by the processor:

allocating transmission resources in a period of a configured grant to a transmitting terminal device, wherein the transmission resources are used for sidelink transmission of a same transmission block; and receiving a preset amount of reporting information reported by the transmitting terminal device to the network device according to a transmission situation and/or feedback information of the sidelink transmission from a receiving terminal device of the sidelink transmission;

wherein the preset amount of reporting information reported by the transmitting terminal device comprises:

a preset amount of acknowledgment reporting information reported by the transmitting terminal device in the period of the configured grant when the same transmission block transmitted by the transmitting terminal device to the receiving terminal device does not support sidelink feedback and a number of transmissions of the same transmission block repeatedly transmitting to the receiving terminal device based on the transmission resources reaches a first threshold or a maximum delay of data.

10. The network device of claim 9, wherein the preset amount of reporting information reported by the transmitting terminal device further comprises:

a preset amount of acknowledgment reporting information to the network device in the period if the transmitting terminal device does not transmit the transmission block to the receiving terminal device based on the transmission resources.

* * * * *